United States Patent
Erkens

(10) Patent No.: US 9,247,504 B2
(45) Date of Patent: Jan. 26, 2016

(54) CAPACITIVE SENSOR DEVICE AND RADIO TRANSCEIVER WITH A CAPACITIVE SENSOR DEVICE AND A METHOD FOR ADJUSTING A TRANSMISSION POWER OF A HANDHELD RADIO TRANSCEIVER

(75) Inventor: Holger Erkens, Düsseldorf (DE)

(73) Assignee: MICROCHIP TECHNOLOGY GERMANY GMBH, Rosenheim (DE)

( * ) Notice: Subject to any disclaimer, the term of this patent is extended or adjusted under 35 U.S.C. 154(b) by 157 days.

(21) Appl. No.: 14/001,460

(22) PCT Filed: Feb. 20, 2012

(86) PCT No.: PCT/EP2012/052865
§ 371 (c)(1),
(2), (4) Date: Feb. 17, 2014

(87) PCT Pub. No.: WO2012/113754
PCT Pub. Date: Aug. 30, 2012

(65) Prior Publication Data
US 2014/0155000 A1 Jun. 5, 2014

(30) Foreign Application Priority Data
Feb. 23, 2011 (DE) .......................... 10 2011 004 622

(51) Int. Cl.
*H04B 5/00* (2006.01)
*H01Q 21/28* (2006.01)
(Continued)

(52) U.S. Cl.
CPC ............... *H04W 52/18* (2013.01); *H01Q 1/245* (2013.01); *H04B 1/3833* (2013.01); *H04B 1/3838* (2013.01); *H04W 52/288* (2013.01); *H04W 52/367* (2013.01)

(58) Field of Classification Search
USPC ............ 455/41.1, 556.1, 67.11, 115.1, 127.1, 455/575.7; 343/700 MS
See application file for complete search history.

(56) References Cited

U.S. PATENT DOCUMENTS 4,623,894 A * 11/1986 Lee et al. ............... 343/700 MS
2004/0046701 A1   3/2004 Huber et al. ................ 343/702
(Continued)

FOREIGN PATENT DOCUMENTS

CN   1507674 A   6/2004   ............... H01Q 1/24
CN   1778015 A   5/2006   ................ B60J 5/04
(Continued)

OTHER PUBLICATIONS

International Search Report and Written Opinion, Application No. PCT/EP2012/052865, 11 pages, Jul. 12, 2012.
(Continued)

*Primary Examiner* — Blane J Jackson
(74) *Attorney, Agent, or Firm* — Slayden Grubert Beard PLLC

(57) ABSTRACT

A capacitive sensor device for a handheld radio transceiver for estimating a specific absorption rate (SAR) can be coupled with at least one first electrode, wherein during the operation of the handheld radio transceiver the first electrode is at the same time a sensor electrode of the capacitive sensor device and an antenna of the handheld radio transceiver. Moreover a handheld radio transceiver with such a capacitive sensor device can be provided. Moreover, a method can be provided for adjusting a transmission power of a handheld radio transceiver, wherein an approach of an object to the handheld radio transceiver is detected and wherein depending on the detected approach the transmission power of the handheld radio transceiver is increased or reduced.

20 Claims, 8 Drawing Sheets

(51) Int. Cl.
  *H04W 52/18* (2009.01)
  *H01Q 1/24* (2006.01)
  *H04B 1/3827* (2015.01)
  *H04W 52/28* (2009.01)
  *H04W 52/36* (2009.01)

(56) References Cited

U.S. PATENT DOCUMENTS

| | | | | |
|---|---|---|---|---|
| 2010/0317302 A1* | 12/2010 | Greenwood et al. | | 455/127.1 |
| 2011/0076966 A1* | 3/2011 | Ishimiya | | 455/78 |
| 2011/0250928 A1* | 10/2011 | Schlub et al. | | 455/550.1 |
| 2012/0214412 A1* | 8/2012 | Schlub et al. | | 455/41.1 |
| 2012/0214422 A1* | 8/2012 | Shi et al. | | 455/67.11 |
| 2012/0231737 A1* | 9/2012 | Ponce De Leon et al. | | 455/41.2 |
| 2013/0241780 A1 | 9/2013 | Amm et al. | | 343/702 |

FOREIGN PATENT DOCUMENTS

| | | | | |
|---|---|---|---|---|
| CN | 101958455 A | 1/2011 | | G01D 5/24 |
| EP | 0564164 A1 | 10/1993 | | G01D 5/24 |
| EP | 2276109 A1 | 1/2011 | | H01Q 1/24 |
| WO | 2009/033510 A1 | 3/2009 | | H01Q 1/24 |
| WO | 2012/113754 A | 8/2012 | | H01Q 1/24 |

OTHER PUBLICATIONS

Chinese Office Action, Application No. 201280013890.9, 12 pages, Jul. 24, 2015.

* cited by examiner

State of the Art

State of the Art

CAPACITIVE SENSOR DEVICE AND RADIO TRANSCEIVER WITH A CAPACITIVE SENSOR DEVICE AND A METHOD FOR ADJUSTING A TRANSMISSION POWER OF A HANDHELD RADIO TRANSCEIVER

CROSS-REFERENCE TO RELATED APPLICATIONS

This application is a U.S. National Stage Application of International Application No. PCT/EP2012/052865 filed Feb. 20, 2012, which designates the United States of America, and claims priority to DE Patent Application No. 10 2011 004 622.4 filed Feb. 23, 2011. The contents of which are hereby incorporated by reference in their entirety.

TECHNICAL FIELD

The invention relates to a capacitive sensor device for a handheld radio transceiver as well as to a handheld radio transceiver which comprises a capacitive sensor device according to the invention. The invention especially relates to a capacitive sensor device for a handheld radio transceiver for estimating a specific absorption rate (SAR) of the handheld radio transceiver. Moreover the invention concerns a method for adjusting a transmission power of a handheld radio transceiver, which preferably comprises a capacitive sensor device according to the invention in order to minimize the absorption of electromagnetic fields, especially in biologic tissue.

BACKGROUND

The specific absorption rate SAR is a measure for the absorption of electromagnetic fields especially in biologic tissue. The specific absorption rate SAR is moreover an important indicator for the irradiation of a high-frequency transmission signal from a radio system, for example a handheld radio transceiver, and its coupling into the human body. The coupling of the high-frequency transmission signal into the human body represents a risk factor in the use of handheld radio transceivers, for example mobile phones, because the absorption of the electromagnetic field energy leads in any case to a warming of the tissue, which can lead to changes in the tissue, which can be the cause of cancer.

There is therefore the necessity to hold the transmission power of handheld radio transceivers, especially if they are situated near the human body, as low as possible, in order to reduce the level of contamination for the body. A statement concerning the coupling of the high-frequency transmission signals into the human body could be used in order to adapt the transmission power of the handheld radio transceiver accordingly.

Two different factors have a substantial influence on the specific absorption rate SAR of a handheld radio transceiver, i.e.

Factor 1: the transmission power effectively irradiated by the handheld radio transceiver (HF transmission power), and Factor 2: the proximity of the antenna or antennas to the human body.

In order to be able to determine or estimate the specific absorption rate SAR as exactly as possible, it is advantageous to evaluate or to detect both factors. I.e., that advantageously both the HF transmission power effectively irradiated and the proximity of the antenna(s) to the body are considered in the determination or valuation of the specific absorption rate SAR. If both factors are considered, a good approximation of the power coupling to the real power coupling into the human body is possible.

If however only one of the two factors is considered, for the other factor the worst case has to be presumed in order to maintain the level of contamination for the body as low as possible. This however has the disadvantage that the transmission power has to be reduced beyond the necessary, which has a negative effect on the transmission properties of the radio system or handheld radio transceiver.

For the detection of the HF power effectively irradiated by an antenna of a handheld radio transceiver and for the detection of the distance of a human body from the handheld radio transceiver or from the antenna of the handheld radio transceiver, solutions are known from prior art. One solution for detecting the irradiated HF power is shown in regard to FIG. 1. FIG. 2 shows a solution for detecting the distance of a human body from an antenna of a handheld radio transceiver.

FIG. 1 shows an approach to a solution known from prior art for detecting the HF transmission power effectively irradiated by an antenna. A HF transmitter, which here consists of a signal generator for generating a HF-carrier signal, a signal production, by which the transmission information to be transmitted is provided, and a mixer, generates a modulated HF transmission signal which is led to a power amplifier PA. With the power amplifier PA the HF transmission signal is brought up to transmission level. The amplifier signal is then, by a circulator and an antenna switch, led to the antenna A, where it is finally irradiated.

The circulator itself is not necessary for normal operation. The circulator is provided here in order to allow in the normal operation a SAR valuation of the signal irradiated at the antenna.

By the circulator the waves reflected by the antenna A are diverted to a demodulator, so that the reflected waves do not appear on the power amplifier PA. The power amplifier PA is always well adapted and delivers its rated power, so that the rated power can be supposed to be constant. In this way it is possible, exclusively based on the changing power of the reflected wave to make a statement concerning the power effectively irradiated by the antenna A. The demodulator here fulfills the function of a rectifier, because only a measure for the power is needed, but not for the transmission information itself. The demodulator is coupled with a SAR evaluation unit and can consist of a DC voltage amplifier and an analog-to-digital converter or a simple comparator. The exact configuration of the SAR evaluation unit mainly depends on how precisely the SAR-valuation has to be.

The approach to a solution shown in FIG. 1 for detecting the HF transmission power effectively irradiated by the antenna is especially suitable for systems with constant envelope, like for example GMSK-/GFSK systems (GSM/DECT). With this approach to a solution above all the direct correlation of the SAR estimation with the HF transmission signal is advantageously exploited, because the power effectively irradiated is detected exactly where the transmission signal produces the coupling into the human body, i.e. at the antenna.

FIG. 2 shows an approach to a solution known from prior art for detecting an object or human body near the handheld radio transceiver. For detecting a distance or an approach of an object or human body to a handheld radio transceiver here a capacitive sensor is provided, which works according to a so-called loading method. In a capacitive sensor operating according to the loading method a sensor electrode is fed with an electric alternating signal of a generator G1. By means of a receiver E1 (or reception path E1) an evaluating device can detect and evaluate the capacitive load of the generated signal. The evaluator can be a component of a SAR evaluation unit.

Generally speaking, the smaller the distance of the electrode from the object or the human body, the greater is the detectable capacitive load. It is however disadvantageous that for a sufficiently good correlation between the antenna signal and the sensor result of the capacitive sensor the electrode must be close to the antenna. By the proximity of the sensor electrode to the antenna the adjustment of the antenna is reduced, so that worse transmission/reception properties for the handheld radio transceiver result. In order to not substantially influence the transmission/reception properties of the radio system by the sensor electrode, it is therefore necessary to arrange the sensor electrode at a certain distance from the antenna. In this way however a correlation between the antenna signal and the sensor result of the capacitive sensor cannot always be guaranteed. In order to nevertheless ensure that the level of contamination for the human body does not exceed a predetermined value, it is therefore necessary to reduce the transmission power of the handheld radio transceiver more than necessary.

SUMMARY

According to various embodiments, solutions can be provided, which allow in a simple and efficient way to make a statement concerning the specific absorption rate SAR of a handheld radio transceiver, which avoid the disadvantages known from prior art and which especially allow to have to reduce the transmission power of a handheld radio transceiver not more than necessary, while at the same time it is guaranteed that the level of contamination for the human body by the handheld radio transceiver does not exceed a predetermined value.

According to various embodiments, a capacitive sensor device for a handheld radio transceiver may comprise a capacitive sensor device, and a method is proposed for adjusting a transmission power of a handheld radio transceiver.

Thus, a capacitive sensor device for a handheld radio transceiver can be provided, especially for estimating a specific absorption rate of the handheld radio transceiver, wherein the sensor device can be coupled with at least one first electrode, and wherein during the operation of the handheld radio transceiver the first electrode is at the same time a sensor electrode of the capacitive sensor device and an antenna of the handheld radio transceiver.

In this way with the capacitive sensor device advantageously the distance of the antenna from an approaching object can be determined, for example from a human body.

It may be advantageous if the first electrode
is coupled by means of a highpass filter with a transceiver circuit of the handheld radio transceiver, and
by means of a lowpass filter with the sensor device.

The sensor device can have additionally a second electrode, which can be brought into a capacitive coupling with the first electrode, wherein one of the two electrodes is operable as transmitting electrode and the other electrode as receiver electrode, and wherein the transmitting electrode can be fed with an electric alternating signal.

As one of the two sensor electrodes is used at the same time as antenna, also in case of multi-electrode systems (capacitive sensor device with several sensor electrodes) advantageously the distance of the antenna from an approaching object, for example a human body, can be determined.

The first electrode can be operated as transmitting electrode, and the first electrode by means of the lowpass filter can be fed with the electric alternating signal.

The sensor device may additionally comprise a third electrode, which is arranged substantially between the first electrode and the second electrode and which can be fed with an electric alternating signal which is substantially inverse to the electric alternating signal fed to the transmitting electrode.

The lowpass filter can comprise a microstrip line.

An evaluation circuit of the sensor device can be designed to detect an approach of an object to the electrodes of the sensor device and/or a distance of an object from the electrodes of the sensor device.

The handheld radio transceiver can have a detection means for detecting the HF transmission power irradiated at the antenna, and the detected HF transmission power together with the detected approach to the electrodes of the sensor device, is included in the valuation of the specific absorption rate of the handheld radio transceiver.

Moreover according to further embodiments, a handheld radio transceiver can be provided, which comprises at least one capacitive sensor device as described above, in which at least one antenna of the handheld radio transceiver can be coupled with the at least one capacitive sensor device and in which during the operation of the handheld radio transceiver the at least one antenna can be operated at the same time as sensor electrode of the capacitive sensor device and as HF antenna of the handheld radio transceiver.

The handheld radio transceiver is at least one of the group two-way radio, mobile phone, cordless telephone, WLAN device, minicomputer, and tablet PC.

The antenna of the handheld radio transceiver can be formed by a MIMO antenna system.

Moreover a method for adjusting a transmission power of a handheld radio transceiver can be provided, in which
an approach of an object to the handheld radio transceiver, preferably to an antenna of the handheld radio transceiver and/or a distance of an object from the handheld radio transceiver, preferably from an antenna of the handheld radio transceiver, is detected and a detection result is provided,
a specific absorption rate of the handheld radio transceiver is estimated, the detection result being included in the estimate of the SAR, and
depending on the estimate the transmission power of the handheld radio transceiver is increased or reduced.

For detecting the approach and/or the distance a capacitive sensor device can be used, wherein an antenna of the handheld radio transceiver is operated at the same time as antenna and as sensor electrode of the capacitive sensor device, and wherein the antenna by means of a lowpass filter is coupled with the capacitive sensor device.

The HF transmission power irradiated at the antenna can be detected and the detected HF transmission power can be included in the estimate of the SAR.

The antenna can be fed with an electric alternating signal of the capacitive sensor device, wherein the capacitive load of the alternating signal is detected and wherein the capacitive load is a measure for the approach and/or for the distance.

Preferably a second electrode of the capacitive sensor device is brought into a capacitive coupling with the antenna of the handheld radio transceiver, in which either the second electrode or the antenna is operated as transmitting electrode and wherein the transmitting electrode is fed with an electric alternating signal of the capacitive sensor device, in which at the other unit—antenna or electrode—the capacitive coupling between the antenna and the second electrode is detected, and wherein the detected capacitive coupling is a measure for the approach and/or for the distance.

A microstrip line can be used as lowpass filter.

BRIEF DESCRIPTION OF THE DRAWINGS

Details and characteristics of the various embodiments result from the following description in connection with the figures. The figures show.

DETAILED DESCRIPTION

With the help of a capacitive sensor or a capacitive sensor device the distance of an object, for example a human body to the sensor electrodes of the capacitive sensor or an approach of an object, for example a human body, to the electrodes of the capacitive sensor can be detected. Depending on the detected distance or the detected approach an estimate of the power coupled into the person of the high-frequency transmission signal irradiated by an antenna of a handheld radio transceiver can be done, so that also an estimate of the specific absorption rate SAR is possible. Based on this estimate the transmission power or HF transmission power of the handheld radio transceiver can be adapted. By the transmission power control the exposure or level of contamination for the human body can be reduced.

The best possible estimate of the specific absorption rate SAR on base of the detected distance or the detected approach is however possible only if it is not the distance or the approach to a sensor electrode arranged near the antenna of a handheld radio transceiver that is included in the SAR estimate but rather the distance of the antenna from the object or the approach of the object to the antenna are considered in the SAR estimation.

According to various embodiments, an electrode of the capacitive sensor device is at the same time a sensor electrode of the capacitive sensor device and an antenna of the handheld radio transceiver. "At the same time" in this context means that the electrode is operated at least during a SAR estimation both as antenna of the handheld radio transceiver and as sensor electrode of the capacitive sensor device. This means that at least during a SAR estimation a distance or proximity detection with the capacitive sensor device is possible, whereas parallelly to the distance or proximity detection a HF transmission signal is irradiated at the sensor electrode or antenna. It is advantageous that an antenna already present in a handheld radio transceiver is used as sensor electrode of the capacitive sensor device. Another advantage consists in the fact, that the real distance of an object, for example a human body, from the antenna of the handheld radio transceiver can be determined, which makes possible an improved transmission power control of the handheld radio transceiver. Another advantage consists in the fact that no separate sensor electrode for the approach or distance detection has to be provided.

Figure 3:
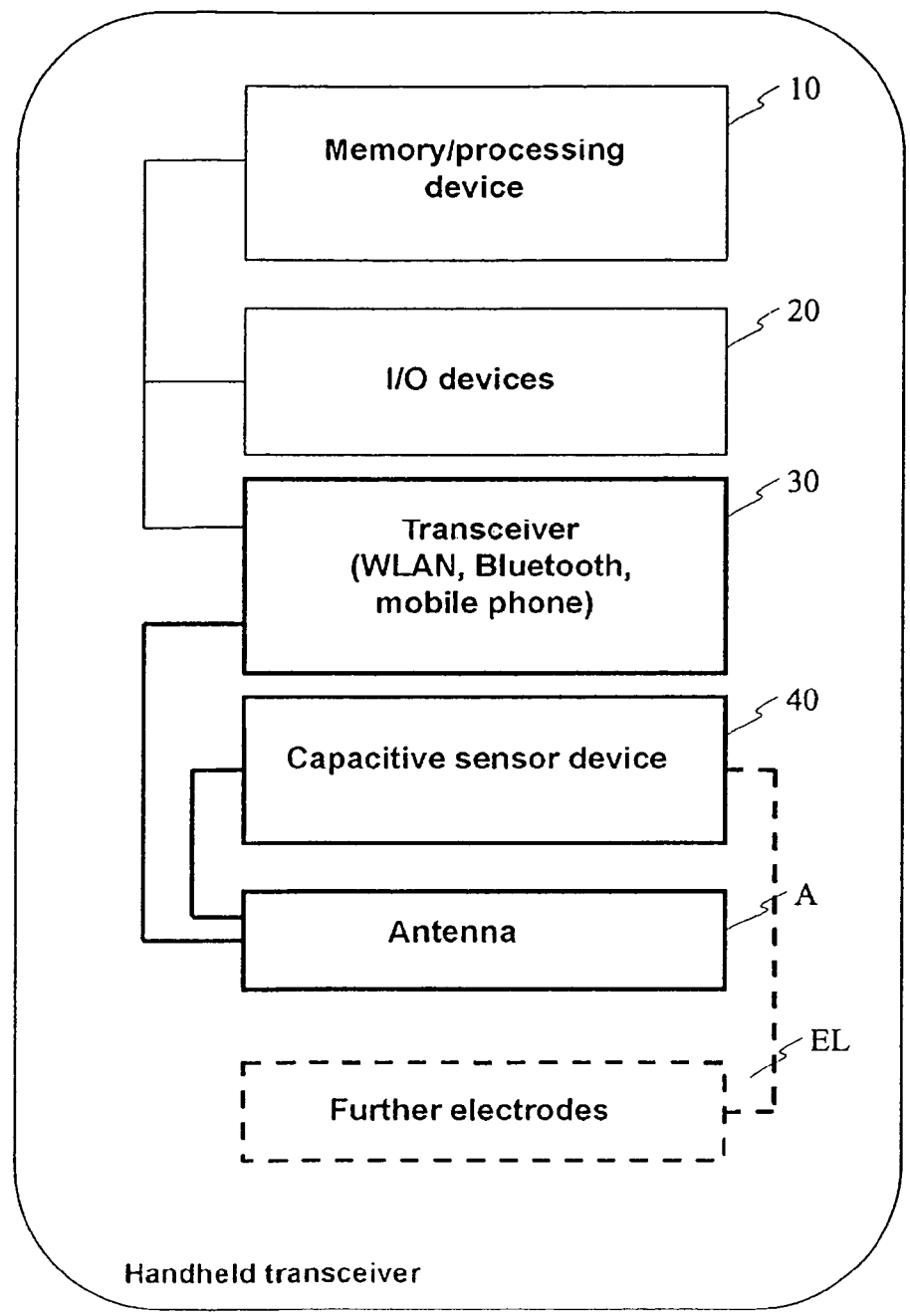
FIG. 3 a schematic block scheme of a handheld radio transceiver with an antenna, a capacitive sensor device, and a transceiver according to one embodiment.

FIG. 3 shows an embodiment of a handheld radio transceiver according to various embodiments with a capacitive sensor device.

The handheld radio transceiver can have a memory/processing device. The storage device can comprise for example a hard disk memory, not transitory memory devices (e.g. flash memory) or transitory memory devices (e.g. DRAM). The processing device can be provided for example for the operation of the handheld radio transceiver and can comprise a processor unit, for example a microprocessor or further accordingly adapted integrated circuits. The processing device can be adapted for executing software on the handheld radio transceiver. The software can for example comprise an internet browser application, a voiceover IP application (VOIP), an e-mail application, operating system functions, control functions for the control of a HF power amplifier, and/or further HF transceiver devices of the handheld radio transceiver, and similar.

The memory/processing device can be especially adapted to implement communications protocols. The communications protocols can for example comprise internet protocols, mobile phone protocols, W-LAN protocols (for example the IEEE 802.11 protocol), or protocols for short-range cordless communication links, like for example the Bluetooth protocol.

The handheld radio transceiver can moreover comprise I/O devices. The I/O devices can for example comprise touchscreens or other user interfaces.

The handheld radio transceiver moreover comprises a transceiver-circuit 30, which for example can comprise a HF transceiver for a mobile phone, for a W-LAN interface or a Bluetooth interface.

The transceiver 30 is coupled with an antenna A (or with several antennas), which can serve both as transmitting antenna and as receiving aerial. The modulated HF transmission signal provided by the transceiver 30 is led to the antenna A, from which it is irradiated.

Moreover the handheld radio transceiver comprises a capacitive sensor device 40, which is also coupled with the antenna A (or with several antennas). The antenna A for the capacitive sensor device 40 assumes the function of a sensor electrode, whereas the antenna A for the transceiver assumes its intended function of a transmitting antenna and/or a receiving aerial. This means that the antenna A is used at the same time as sensor electrode for the capacitive sensor device 40 and as antenna for the transceiver 30.

As antenna A can be provided every antenna type suitable for a handheld radio transceiver. For example antennas of the type PIFA (Planar Inverted-F (shaped) Antenna) can be used.

For further embodiments of the capacitive sensor device (as described in regard to FIGS. 5 to 7) further electrodes EL can be provided. Also when providing further sensor electrodes at least one sensor electrode of the capacitive sensor device 40 is formed by the antenna of the handheld radio transceiver, so that also in case of the embodiments described with regard to FIGS. 5 to 7 the real distance of an object from the antenna or an approach of an object to the antenna can be detected. Moreover the embodiment of the capacitive sensor described in regard to FIGS. 5 to 7 has the advantage that the number of the sensor electrodes is reduced, as at least one sensor electrode is formed by the antenna of the handheld radio transceiver.

Moreover the handheld radio transceiver can comprise a device not shown in FIG. 3 for control of the transmission power of the HF transmission signal irradiated at the antenna A. This control device can, on the basis of the detection results of the capacitive sensor device and/or on the basis of the HF transmission power effectively irradiated by the antenna, undertake a SAR estimation and, on the basis of the result of the SAR estimation, adjust the transmission power of the antenna accordingly.

Moreover the handheld radio transceiver can have several antennas, in which every antenna can be used as transmission and/or receiving aerial. The several antennas can for example be operated as a MIMO system (Multiple Input Multiple Output).

According to various embodiments each antenna of the handheld radio transceiver can be used as sensor electrode of a capacitive sensor device assigned to the respective antenna. Alternatively every antenna of the handheld radio transceiver can be used as sensor electrode for a selected capacitive sensor device. In the latter case the antennas can for example be coupled with the capacitive sensor device in a time-division multiplex method. According to various embodiments in this way the distance of an object, for example a human body, from each single antenna can be detected, so that for each antenna an own SAR estimation can be done. Also in case of several antennas in the respective SAR estimation also the HF transmission power effectively irradiated by the respective antenna can be considered. According to various embodiments that antenna can be activated as transmitting antenna of the handheld radio transceiver, for which the lowest SAR-value was estimated.

Figure 4:
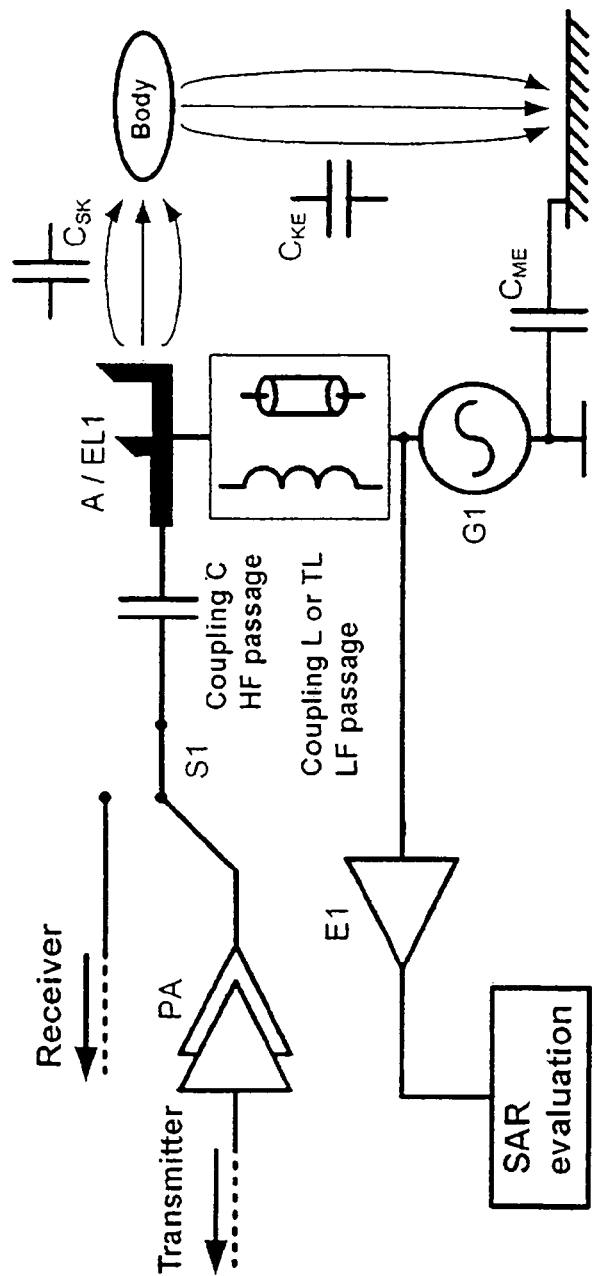
FIG. 4 an embodiment of a capacitive sensor device, which can be operated according to a loading method.

In the following in regard to FIG. 4 to FIG. 7 four principles according to various embodiments of a capacitive sensor device are described. The figures show: FIG. 4 a capacitive sensor device according to various embodiments according to the loading principle, FIG. 5 a capacitive sensor device according to various embodiments according to the transmission principle, FIG. 6 a capacitive sensor device according to various embodiments with a third electrode, the so-called compensation electrode, and FIG. 7 a differential capacitive sensor according to various embodiments.

FIG. 4 shows a capacitive sensor device according to various embodiments for a handheld radio transceiver for detecting an approach of an object to the electrodes of the sensor device and/or for detecting a distance of an object from the electrodes of the sensor device. It is essential that the antenna A is used at the same time as sensor electrode EL1 of the capacitive sensor device. In the capacitive sensor shown in FIG. 4, operating according to the loading method, the capacitive load of an exchange point in an electric network to which the sensor electrode EL1 or the antenna A connected, is measured. The capacity of the electrode EL1 or the antenna A and thus the capacitive load of the exchange point in the electric network vary with the approach of an object, for example a human body. The capacitive load of the exchange point is therefore a measure for the approach of the body to the electrode EL1 or for the distance of the body from the electrode EL1.

Figure 5:
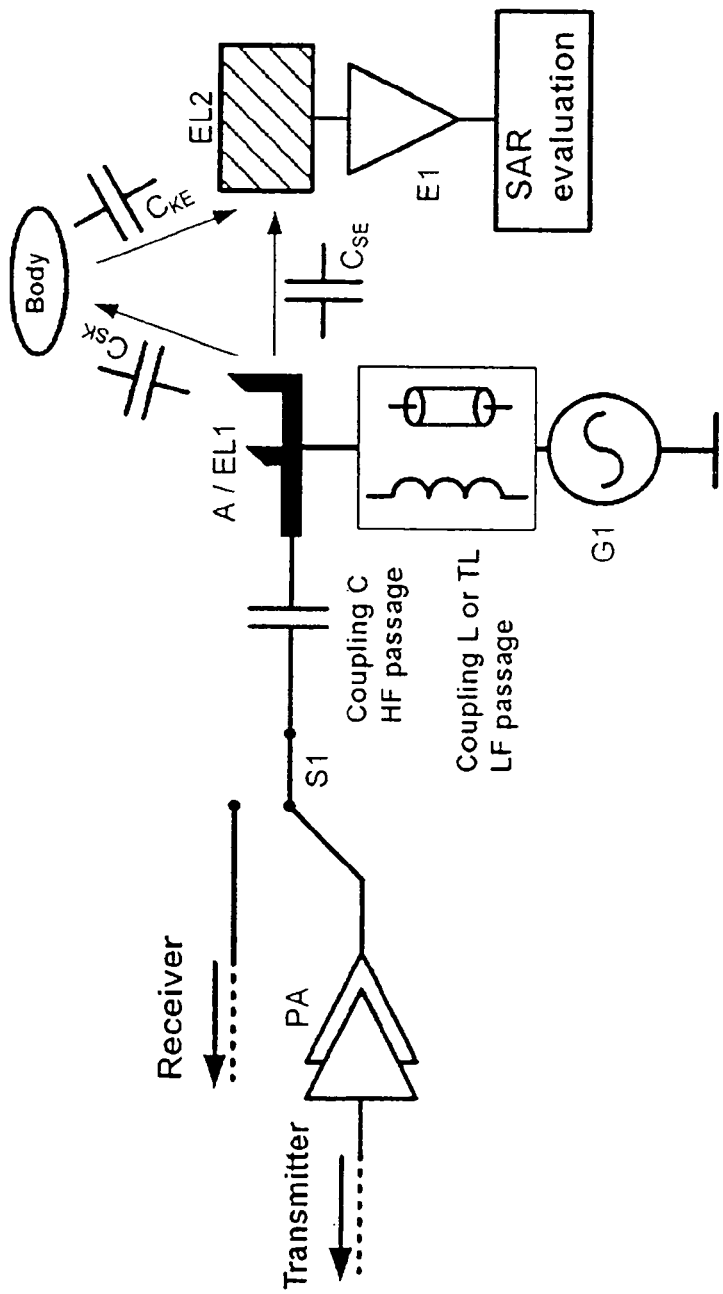
FIG. 5 an embodiment of a capacitive sensor device, which can be operated according to a transmission method.
Figure 6:
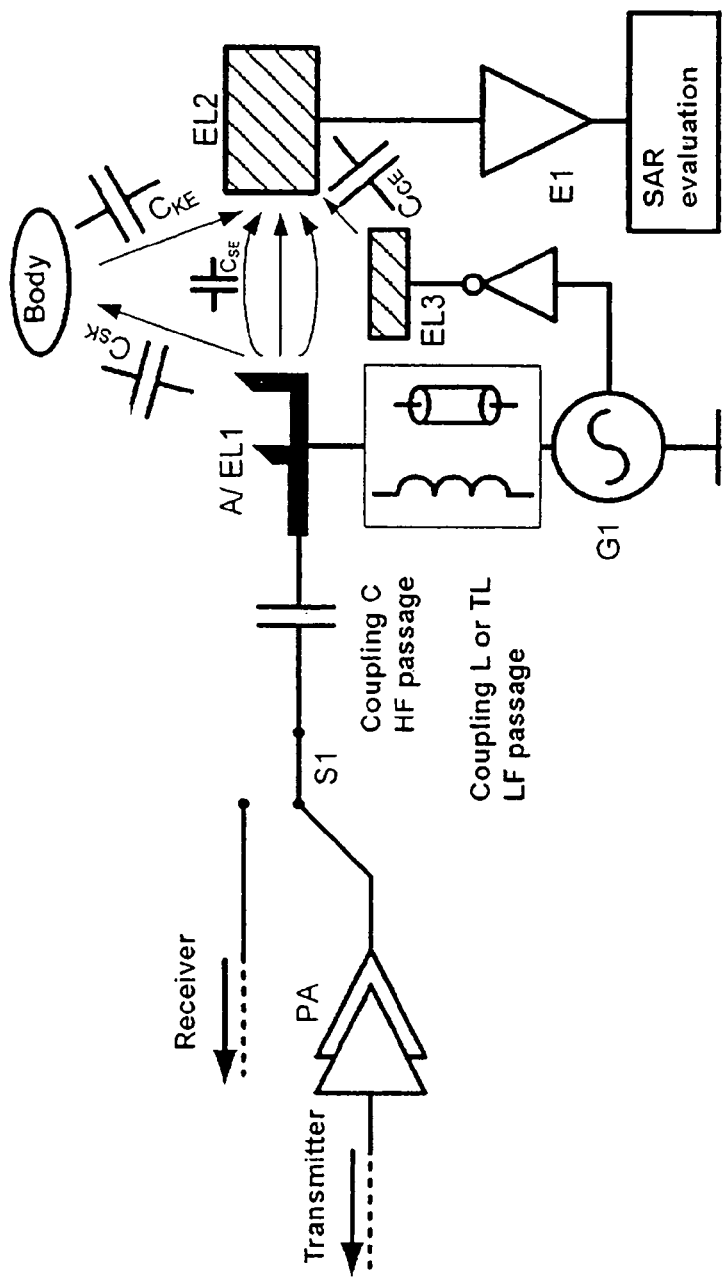
FIG. 6 an embodiment of a capacitive sensor, which additionally comprises a compensation electrode.
Figure 7:
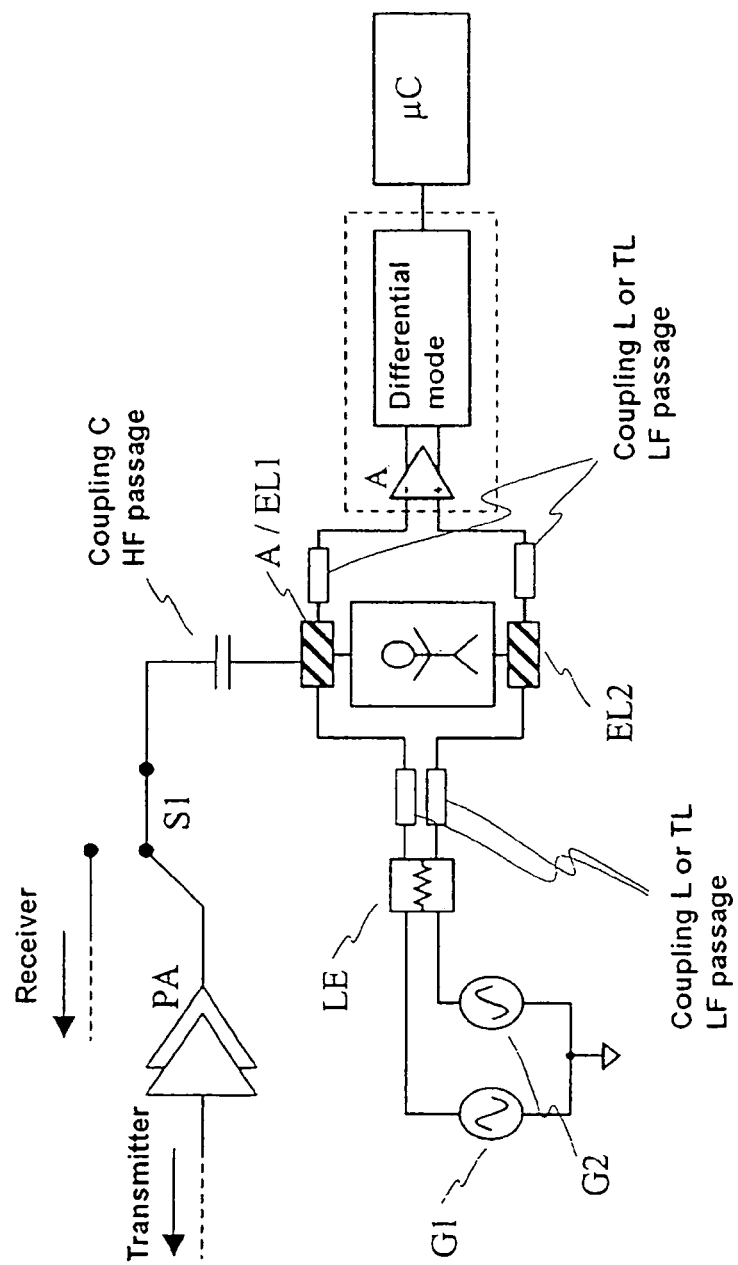
FIG. 7 a differential capacitive sensor, wherein a sensor electrode is formed by an antenna of a handheld radio transceiver.

In the embodiment shown in FIG. 4 of the capacitive sensor as well as in the capacitive sensors shown in FIG. 5 to FIG. 7 on the one hand the capacitive sensor device has to be connected to the antenna A serving as sensor electrode EL1 and on the other hand the transceiver circuit (HF transceiver) has to be connected to the antenna. The coupling described in the following of the antenna A to the HF transceiver and to the capacitive sensor device accordingly also applies for the capacitive sensor devices according to various embodiments described in relation to FIGS. 5 to 7.

The HF transceiver circuit is connected to the antenna A by a coupling C. The coupling C acts here as pure HF passage (highpass filter). Behind the coupling C the HF path divides into a transmission path and a reception path, which are connected by means of an antenna switch S1 with the antenna or with the highpass filter. The antenna switch S1 can be configured for example as a frequency multiplexer.

By means of a coupling L or TL the capacitive sensor device is connected to the antenna A or sensor electrode EL1 The coupling L or TL acts here as a LF passage (lowpass filter). The coupling can be implemented for example with the aid of a coil L or a microstrip line TL. Preferably the microstrip line is very thin, which has no disadvantages for the sensor function of the capacitive sensor device. A very thin microstrip line presents a high radiation resistance. Such a line with high radiation resistance and the capacitive sensor device following the microstrip line only have a small influence on the HF circuit or on the HF transceiver, because HF circuits or HF transceivers are exclusively designed for low radiation resistances (roughly 50Ω).

A microwave line compared to a coil has the advantage that it is printed on the board. Acquisition and assembly costs for a coil can be avoided in such a way. However for the microstrip line a determined minimum length is necessary, in order to obtain or guarantee a good decoupling of the capacitive sensor from the HF circuit.

Which variant of the coupling of the capacitive sensor device to the antenna A or electrode EL1 is selected, depends in the end from the concrete requirements as to the radio system or the handheld radio transceiver.

The highpass filter between antenna and HF transceiver ensures that the low frequency alternating signals of the capacitive sensor device do not negatively affect the HF transceiver, whereas the lowpass filter between antenna A and the capacitive sensor device ensures that the high-frequency signals of the HF transceiver do not negatively affect the capacitive sensor device.

According to the embodiment shown in FIG. 4, by a signal generator G1 an electrical alternating signal (sinuous or rectangular) is generated, which is fed by the lowpass filter of the antenna A or sensor electrode EL1 The antenna A or sensor electrode EL1 couples by means of a reserve capacity $C_{SK}$ with the human body, which by means of a reserve capacity $C_{KE}$ is connected to the surrounding ground potential. The sensor mass is also connected to ground by means of a reserve capacity $C_{ME}$.

If a body approaches the antenna, the total capacity of the reserve capacities connected in series increases, which leads to a growing capacitive load of the generator signal. This load can be detected in the receiver path El of the capacitive sensor device and be fed to a following SAR evaluation unit, which can undertake a SAR estimation based on the detected capacitive load. As the detected capacitive load substantially corresponds to the distance of the human body from antenna A of the handheld radio transceiver, a SAR estimation can be done, in which the real distance of the human body from antenna A is included.

The SAR evaluating device can also be fed with an information on the power effectively irradiated by the antenna. This information can be obtained for example with a detection means according to FIG. 1. For the SAR estimation thus both the real distance of the human body from antenna A and the transmission power effectively irradiated by the antenna A can be considered. In this way a particularly precise SAR estimation is possible, so that the transmission power of the handheld radio transceiver can be even better adapted, (especially increased) without the level of contamination exceeding a predetermined value for the human body.

FIG. 5 shows a capacitive sensor device according to various embodiments for a handheld radio transceiver which works according to the so-called transmission method. The capacitive sensor device operating according to the transmission method measures the transmission between a transmitting electrode EL1 and a receiving electrode EL2. The antenna A of the handheld radio transceiver assumes either the function of the transmitting electrode or that of the receiving electrode. In the embodiment shown in FIG. 5 the antenna A serves at the same time as transmitting electrode EL1 of the capacitive sensor device. Moreover another dedicated electrode EL2 is provided, which assumes the function of a receiving electrode. Whether the antenna A is used as transmitting electrode or as receiving electrode, depends in the end on the concrete requirements as to the handheld radio transceiver or as to the antenna A of the handheld radio transceiver.

The signal generator G1 is, as explained in regard to FIG. 4, coupled by means of a lowpass filter with the antenna A or transmitting electrode EL1. The SAR evaluating device on the other hand is coupled with the receiving electrode EL2.

If the antenna A is used as receiving electrode, the SAR evaluating device is to be coupled by means of the lowpass filter with the antenna A, for example as shown in FIG. 4. The signal generator G1 can then be connected directly to the electrode EL2 operated as transmitting electrode.

Also in the embodiment shown in FIG. 5 the transceiver (HF transceiver) of the handheld radio transceiver is connected by means of a highpass filter to the antenna A. The highpass filter and the lowpass filter assume the function already described in regard to FIG. 4.

By the signal generator G1 an electrical alternating signal is generated and fed to the transmitting electrode EL1 or to the antenna A. The electric alternating signal is transmitted via the direct coupling path $C_{SE}$ between the electrode EL1 and the receiver electrode EL2 or via the coupling path formed by the human body $C_{SK}$, $C_{KE}$ from the transmitting electrode EL1 to the receiving electrode EL2. The electric alternating signal transmitted to the receiving electrode EL2 is fed to the receiver El assigned to the receiving electrode EL2 and transmitted to a downstream SAR evaluating device.

In case of approach of a body to the electrodes EL1, EL2 of the capacitive sensor device the capacitive coupling between the electrodes over the body ($C_{SK}$, $C_{KE}$) increases whereas the ground coupling over $C_{SE}$ is reduced. In the evaluation of the electric signal tapped at the receiving electrode EL2 it is relevant which coupling path between the electrode EL1 and the electrode EL2 is dominant. I.e. the result of the signal evaluation of the electric signal tapped at the receiving electrode EL2 mainly depends on if the coupling path $C_{SE}$ or the coupling path $C_{SK}$, $C_{KP}$ dominates.

Which of the two coupling paths is dominant, substantially depends on the geometry and the disposition of the electrodes in relation to each other. If the electrodes present a large electrode surface and the distance of the electrodes from each other is large, in case of an approach of a human body to the electrodes EL1, EL2 a signal rise of the electric signal tapped at the receiving electrode EL2 is detected. If the electrodes present a small electrode surface and the distance of the electrodes from each other is small, in case of an approach of a human body to the electrodes EL1, EL2 a reduction of the electric signal tapped at the receiving electrode EL2 is detected.

Preferably an electrode EL2 with a large electrode surface is selected and arranged at a large distance from the antenna A or electrode EL1, because in this way the influence of the electrode EL2 on the antenna can be reduced. In case of the reduction approach, i.e. in a solution with a small-surface electrode arranged near the antenna or electrode EL1, the electrode EL2 can cause a detuning of the antenna. The reduction approach can be used in case of an appropriate distance also with a large-surface electrode EL2 or with a large-surface antenna A. Which of the solutions is used in a concrete handheld radio transceiver, depends in the end on the concrete requirement as to the handheld radio transceiver. If there is relatively little space for arranging an electrode EL2, it can also be advantageous to implement a solution according to the reduction approach.

FIG. 6 shows another embodiment of a capacitive sensor device for a handheld radio transceiver. In addition to the electrode EL2 shown in FIG. 5 here a third electrode EL3 is provided. Preferably the electrode EL3 is arranged between the transmitting electrode EL1 or antenna A and the receiving electrode EL2. In case of the embodiment shown in FIG. 6 the antenna A is used as transmitting electrode EL1 and the electrode EL2 is used as receiving electrode. Depending on the concrete requirements as to the radio system however also the antenna A can be used as receiving electrode and the electrode EL2 as transmitting electrode.

The coupling of the antenna A with the capacitive sensor device in this respect substantially corresponds, as already shown in regard to FIG. 4 and FIG. 5, i.e. by means of a lowpass filter. The coupling of the antenna with the transceiver (HF transceiver) of the handheld radio transceiver by means of a highpass filter also corresponds, as already shown in regard to FIG. 5 and FIG. 6. The lowpass filter and the highpass filter in this respect also fulfil the function described in regard to FIG. 4 and FIG. 5.

The electrode EL3, which is arranged between the transmitting electrode EL1 and the receiving electrode EL2, is fed with an electric alternating signal, which can be substantially anti-phase to the electric alternating signal fed to the transmitting electrode EL1. The electric alternating signal fed to the third electrode EL3 can also be provided by the signal generator G1. By providing the third electrode EL3 a capacitive ground coupling between the transmitting electrode EL1 and the receiving electrode EL2 can be reduced or eliminated.

Also in the embodiment shown in FIG. 6 of a capacitive sensor device the antenna A can be used both as transmitting electrode and as receiving electrode. Like in the embodiment shown in FIG. 5, also in the embodiment shown in FIG. 6 it depends on the concrete requirements as to a handheld radio transceiver, if the antenna A is used as transmitting electrode or as receiving electrode.

The receiving electrode and the third electrode EL3 can be used together for an absorption measurement for approximation detection in case of strong ground reference. In this case it is advantageous to use the antenna A as transmitting electrode, because the receiving electrode and the third electrode EL3 should be arranged near each other, and because the electrodes EL2, EL3 should be arranged possibly far from the antenna A in order to avoid or to minimize effects of the electrodes EL2, EL3 on the HF functionality of the antenna.

The capacitive ground coupling $C_{SE}$ between the transmitting electrode EL1 and the receiving electrode EL2, despite of the larger distance between the electrode EL1 and the electrode EL2, may entail a limitation of the dynamic range at the receiver. This limitation of the dynamic range at the receiver can be reduced or eliminated by the third electrode EL3, which is operated inversely to the transmitting electrode and over $C_{CE}$ couples with the receiving electrode EL2. By the signal inversion the composite signal at the receiving electrode EL2 is reduced, and so the dynamic range of the receiver is widened.

Figure 1:
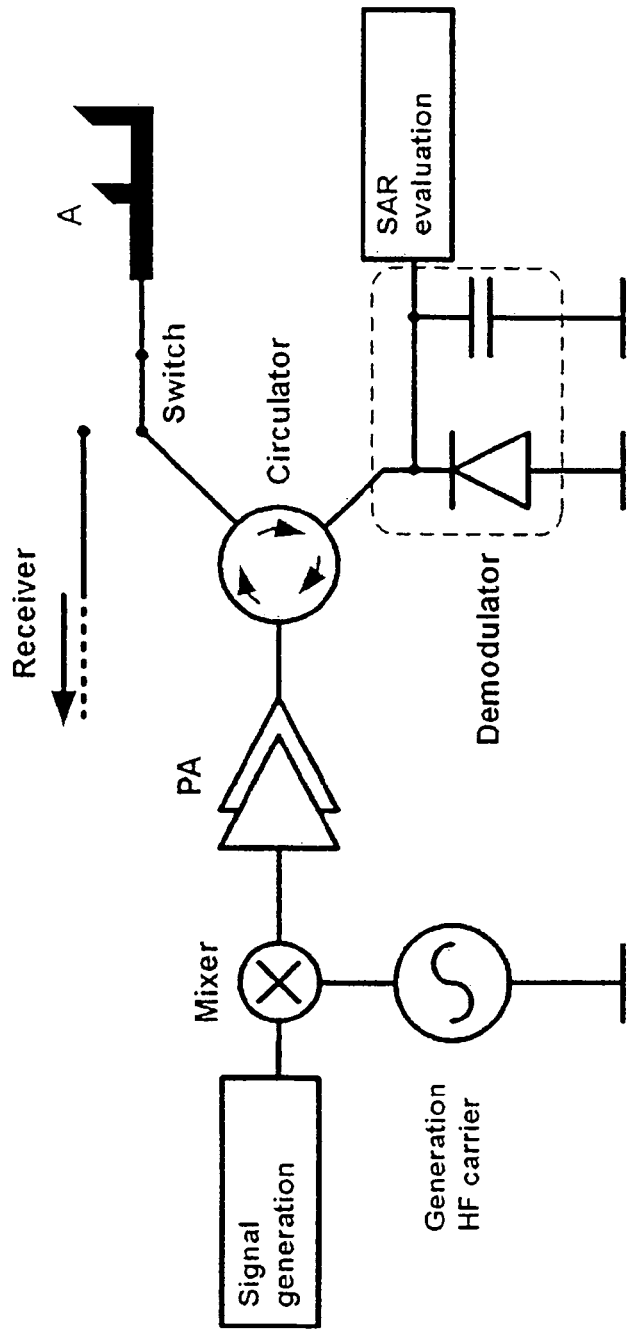
FIG. 1 a conventional approach to a solution for detecting a HF transmission power effectively irradiated by an antenna.
Figure 2:
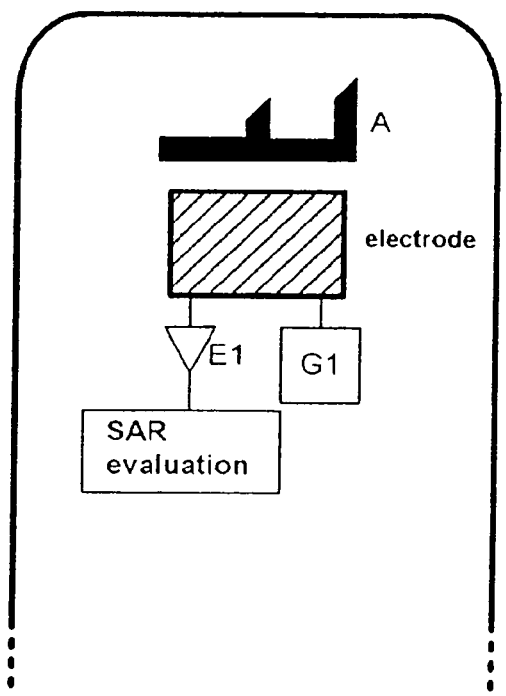
FIG. 2 a conventional approach to a solution for detecting an object or human body, especially near a handheld radio transceiver.

The capacitive sensor devices shown in FIGS. 4 to 7 can be also combined with a device for HF power detection, as shown in FIG. 1. In this way an even more precise statement can be made concerning the power effectively coupled into the body, and the radio system or handheld radio transceiver can operate more closely to the specified SAR limit. This means that the transmission power need not be reduced unnecessarily in order to ensure that a predetermined limit value for the level of contamination of a human body is not exceeded. Unlike in systems in which only a HF power detection or only an approach to the body is measured, as shown in FIG. 1 or FIG. 2, in case of an approach of a body to the handheld radio transceiver nevertheless a wider range can be obtained.

FIG. 7 shows another embodiment of a capacitive sensor for a handheld radio transceiver, which is configured substantially as a differential capacitive proximity sensor. The capacitive differential proximity sensor substantially includes two sensor electrodes EL1, EL2, a signal generator, an electrical load device and an electric circuit for the separation of a differential mode portion from a common mode portion of an electric signal. In the embodiment shown in FIG. 7 either the sensor electrode EL1 or the sensor electrode EL2 can be formed by the antenna A of the handheld radio transceiver.

The sensor electrodes comprise a first sensor electrode EL1 and a second sensor electrode EL2, which in the sensor system operate on an equal basis and are at the same time transmission and reception electrodes. In the embodiment shown here the electrode EL1 is at the same time the antenna of the handheld radio transceiver. The signal generator is coupled by means of the electric load device LE with the two sensor electrodes EL1 and EL2. The signal generator provides a differential alternating voltage, which is fed by means of the electric load device LE to the sensor electrodes EL1 and EL2. The signal generator can comprise two asymmetric generators G1 and G2, which each generate an identical signal, the signal of the generator G1 having a phase difference of 180° from the signal of the generator G2. By means of the electric load LE the signal of the first generator G1 is fed to the first sensor electrode EL1 the signal of the generator G2 dephased by 180° is fed to the second sensor electrode EL2 by means of the load device LE.

The electric load LE together with the capacitive load to be measured, which is formed by an object approaching the sensor electrodes EL1, EL2, can form a low-pass filter of the first order. The electric load LE can be realized for example by means of resistors. The electric load can however also be realized by the load of an upstream differential amplifier. The load can be part of the differential amplifier.

Moreover between the electric load LE and the electrodes A/EL1 and EL2 each time a lowpass filter may be arranged, as shown in FIG. 4 to FIG. 6.

The circuit for separating the differential mode portion from the common mode portion of an electric signal can be realized for example by means of a fully differential amplifier A1. The differential mode signal influenced by an electrically conductive object between the sensor electrodes EL1 and EL2 can be selected with the help of the fully differential amplifier A1 and be fed to a differential mode evaluating device (differential receiving and evaluating device). The differential mode evaluating device can be implemented separately or as part of a larger signal processing unit, for example a microcontroller. The differential mode evaluating device can be fed with the differential output signal of the amplifier A1. Alternatively also only one of the two signal conductors can be fed for further processing to the differential mode evaluating device. In a still further alternative the differential output signal of the fully differential amplifier A1 can be transformed into a grounded signal, which is fed to the differential mode evaluating device.

As can be seen in FIG. 7, the load LE of the fully differential amplifier A1 is switched in parallel with the electrode pair EL1 and EL2. Altogether this results in a low pass of the first order taking into account the capacitive network introduced by the person. The electric load LE is preferably sized in such a way that in case of an approach of a person to the sensor electrodes EL1, EL2 between the states "no person in the electric alternating field" and "maximum approach" a maximum change of amount in the transfer function of the lowpass filter results. The level is always reduced in case of an approach of a person to the sensor electrode, because the time constant of the filter rises and the effective cut-off frequency of the filter falls.

Main features of the capacitive proximity sensor are the differential signal, with which the filter is excited, as well as the downstream differential mode evaluation, provided with the help of the fully differential amplifier A1 and the differential mode evaluating device. Usually in a system with three conductors (two signal conductors and ground), as in the capacitive proximity sensor described here, the existence of two kinds of signal is possible, every signal presenting characteristic properties. The two kinds of signal comprise the so-called differential mode signals and the so-called common mode signals.

The differential mode signals are characterised by the same amplitude on both signal conductors with a phase offset of exactly 180°. The signals are thus identical except for the phase shift. As the signal voltage is directed each time against the other signal conductor, between both signals a so-called virtual ground results, that has certain properties in common with the real earth ground. Thus for a alternating signal virtual ground and earth ground are on the same potential, which means that between them no flow of current takes place.

Common mode signals are characterized by the same amplitude on both signal conductors with perfectly identical phase. Since the common mode portion always comprises the same potential on both signal conductors, circuit parts independent of mass between the signal conductors are not crossed by common mode currents.

The signals on a pair of conductors can be always broken up in the two above-mentioned parts (differential mode portion and common mode portion). The capacitive proximity sensor according to an embodiment uses the differential mode signal, which is generated and provided by the signal generators G1 and G2, fed to the electrodes EL1 and EL2 and is afterwards evaluated. Because parasitic signals couple into the sensor system or into the sensor electrodes EL1 and EL2 mostly as common mode interference, they are deleted in the differential mode evaluation and do not impair further processing. The capacitive proximity sensor according to this embodiment is therefore particularly robust against interferences.

In case of radio systems with several antennas, in case of appropriate arrangement of the antennas towards each other, also the second electrode EL2 may be formed by an antenna, so that in the end also for the differential proximity sensor shown in FIG. 7 no additional electrodes are needed.

Further embodiments of a differential capacitive proximity sensor are described in the German patent application also filed by the applicant DE 10 2011 002 447, in which each time one of the sensor electrodes is formed by an antenna of the handheld radio transceiver.

Figure 8:
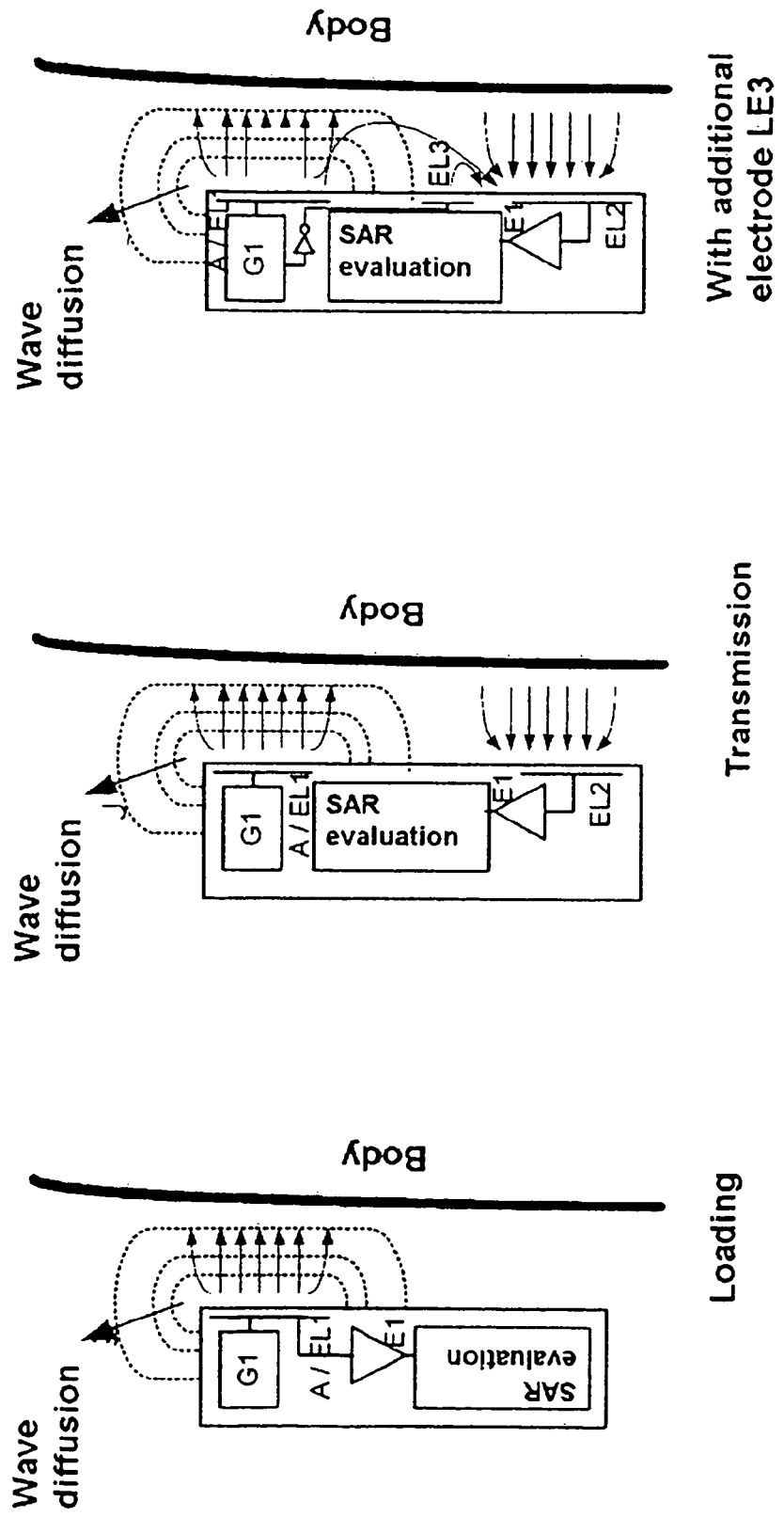
FIG. 8 examples for a possible electrode arrangement at a handheld radio transceiver for the embodiments shown in FIG. 4 to FIG. 7.

FIG. 8 shows three handheld radio transceivers, in which on the left a handheld radio transceiver with a capacitive sensor device according to the loading method is shown, in the middle a handheld radio transceiver with a capacitive sensor device according to the transmission method and on the right a handheld radio transceiver with a capacitive sensor device with an additional third electrode.

For a capacitive sensor which works according to the loading method no additional electrode is necessary, because the only electrode EL1 necessary for this purpose is formed by the antenna A of the handheld radio transceiver. As shown above, here the real distance between antenna A and the human body is detected, which corresponds most likely to a value for a coupling of the HF transmission power into the human body.

For the handheld radio transceiver shown in the middle with a capacitive sensor working according to the transmission method, additionally an electrode EL2 is necessary, which is to be arranged in a suitable position relatively to the electrode EL1 or antenna A on the handheld radio transceiver. The disposition of the electrode EL2 on or in the handheld radio transceiver should be selected in such a way that the electrode EL2 is possibly covered (for example by the housing shell) when also the antenna A is covered. Moreover a distance between the antenna A or electrode EL1 and the electrode EL2 has to be chosen in such a way that the capacitive ground coupling EL2 between the antenna and the electrode is not excessive, which may entail a detuning of the antenna.

For the elimination of the capacitive ground coupling between the antenna A or electrode EL1 and the second electrode EL2 an additional third electrode EL3 can be provided, which is to be arranged between the electrode EL1 and the electrode EL2, like in the right part of FIG. 8. As explained above, the electrode EL3 is to be fed with an electric alternating signal which is anti-phase to the electric alternating signal to be fed to the electrode EL1 (transmission electrode).

The simultaneous use of an antenna of a handheld radio transceiver as sensor electrode of the capacitive sensor device has several benefits:

the number of the sensor electrodes necessary for a capacitive sensor device can be reduced. For example for a capacitive sensor device which works according to the loading method, no own or additional sensor electrode is necessary, because the antenna of the handheld radio transceiver acts as sensor electrode. In a capacitive sensor device according to the transmission method only one further sensor electrode is necessary, because one of the two sensor electrodes is formed by the antenna. Also in the three-electrode system, as shown in FIG. 6, only two additional electrodes are needed, because here too the antenna of the handheld radio transceiver is used as sensor electrode. This entails lower costs for the capacitive sensor device. Moreover there are less restrictions in the equipment design, because each time one electrode less has to be provided, which would have to be connected and positioned. Especially in very compact handheld radio transceivers, for example mobile phones, the space for arranging an electrode is restricted, so that especially in case of small handheld radio transceivers doing without an electrode is particularly advantageous.

In handheld radio transceivers with several antennas (for example in a smart phone with a mobile phone antenna and a GPS antenna) in case of a suitable arrangement of the antennas in relation to each other, even in the transmission method shown in FIG. 6 the second electrode EL2 can be dispensed with, because one electrode for example can be formed by the mobile phone antenna and the other electrode for example by the GPS antenna.

Moreover in multiple-antenna systems, for example M1MO systems, some or all of the antennas can be used as sensor electrode at the same time, so that for the transmission method no additional sensor electrodes are necessary.

As the antenna both emits the HF radiation to be estimated and at the same time is part of the sensor path of the capacitive sensor, the statement of the capacitive sensor is strongly correlated with the HF irradiation.

Especially the capacitive sensor devices according to various embodiments, compared to conventional sensor device as for example shown in FIG. 2, have the advantage that the abovementioned correlation need not be generated by an approach of the sensor surfaces to the antenna. In this way it is prevented that with increasing approach of the sensor surfaces to the antenna the diffusion properties of the antenna are influenced negatively. The handheld radio transceiver is maybe no more well adapted and cannot emit its complete power in the transmission case and in the reception case does not have its full sensitivity.

The capacitive sensor device according to various embodiments has been described above in connection with a handheld radio transceiver. A handheld radio transceiver can be for example a mobile phone, a cordless telephone, a smart phone, a portable minicomputer, a tablet PC, a WLAN device, or similar.

What is claimed is:

1. Capacitive sensor device for a handheld radio transceiver connected with an antenna element, for estimating a specific absorption rate (SAR) of the handheld radio transceiver, wherein the sensor device is coupled with the antenna element, and wherein during the operation of the handheld radio transceiver the antenna element is at the same time a sensor electrode of the capacitive sensor device and an antenna of the handheld radio transceiver wherein the sensor device further comprises a second electrode, which can be brought into a capacitive coupling with them antenna element, wherein one of the antenna element and the second electrode is operable as transmitting electrode and the respective other one as receiver electrode, and wherein the transmitting electrode can be fed with an electric alternating signal.

2. Capacitive sensor device according to claim 1, wherein the antenna element is coupled via a highpass filter with a transceiver circuit of the handheld radio transceiver, and is coupled via a lowpass filter with the sensor device.

3. Capacitive sensor device according to one claim 2, wherein the lowpass filter comprises a microstrip line.

4. Capacitive sensor device according to claim 1, wherein the antenna element is operated as a transmitting electrode, and wherein the antenna element receives an electric alternating signal via a lowpass filter.

5. Capacitive sensor device according to claim 1, wherein the sensor device further comprises a third electrode, which is arranged substantially between the antenna element and the second electrode and which is fed with an electric alternating signal which is substantially inverse to the electric alternating signal fed to the transmitting electrode.

6. Capacitive sensor device according to claim 1, wherein an evaluation circuit of the sensor device is configured to detect an approach of an object to the electrodes of the sensor device and/or a distance of an object from the electrodes of the sensor device.

7. Capacitive sensor device according to claim 1, comprising a detection means for detecting the HF transmission power irradiated at the antenna element, wherein the detected HF transmission power together with the detected approach to the electrodes of the sensor device is included in the estimate of the SAR of the handheld radio transceiver.

8. Handheld radio transceiver, comprising a capacitive sensor device according to claim 1, wherein the antenna element of the handheld radio transceiver is coupled with the capacitive sensor device and in which during the operation of the handheld radio transceiver the antenna element can be operated at the same time as sensor electrode of the capacitive sensor device and as HF antenna of the handheld radio transceiver.

9. Handheld radio transceiver according to claim 8, which is at least one of the group two-way radio, mobile phone, cordless telephone, WLAN device, minicomputer, and tablet PC.

10. Handheld radio transceiver according to claim 8, wherein the antenna element is coupled via a highpass filter with a transceiver circuit of the handheld radio transceiver, and is coupled via a lowpass filter with the sensor device.

11. Handheld radio transceiver according to claim 8, wherein the antenna element is operated as a transmitting electrode, and wherein the antenna element receives an electric alternating signal via a lowpass filter.

12. Handheld radio transceiver according to claim 11, wherein the sensor device further comprises a third electrode, which is arranged substantially between the antenna element and the second electrode and which is fed with an electric alternating signal which is substantially inverse to the electric alternating signal fed to the transmitting electrode.

13. Handheld radio transceiver according to claim 8, wherein an evaluation circuit of the sensor device is configured to detect an approach of an object to the electrodes of the sensor device and/or a distance of an object from the electrodes of the sensor device.

14. Handheld radio transceiver according to claim 8, comprising a detector for detecting the HF transmission power irradiated at the antenna, wherein the detected HF transmission power together with the detected approach to the electrodes of the sensor device is included in the estimate of the SAR of the handheld radio transceiver.

15. Method for operating a handheld radio transceiver comprising a capacitive sensor device for a handheld radio transceiver connected with an antenna element, wherein the sensor device is coupled with the antenna element and configured to operate as a sensor electrode of the capacitive sensor device and an antenna of the handheld radio transceiver, wherein a second electrode of the capacitive sensor device is brought into a capacitive coupling with the antenna of the handheld radio transceiver, the method comprising the steps:

using the antenna element of the handheld radio transceiver as a capacitive sensor to determine a capacitive value, wherein either the second electrode or the antenna element is operated as a transmitting electrode and the other one as a receiving electrode and, feeding the transmitting electrode with an electric alternating signal of the capacitive sensor device, wherein the capacitive coupling between the antenna element and the second electrode is dependent on the proximity of an object and is detected as the capacitive value, and wherein the detected capacitive coupling is a measure for the approach and/or for the distance;

estimating a specific absorption rate (SAR) of the handheld radio transceiver from the capacitive value, and increasing or decreasing the transmission power of the handheld radio transceiver depending on the estimate.

16. Method according to claim 15, wherein for detecting the capacitive value, an alternating signal is fed to the antenna element through a low pass filter or transmission line.

17. Method according to claim 15, wherein the HF transmission power irradiated by the antenna is detected and the detected HF transmission power is included in the estimate of the SAR.

18. Method according to claim 15, wherein the capacitive load of the alternating signal is detected as the capacitive value, the capacitive load being a measure for the approach and/or for the distance.

19. Handheld radio transceiver comprising a capacitive sensor connected with an antenna element, for estimating a specific absorption rate (SAR) of the handheld radio transceiver, wherein the sensor device is coupled with the antenna element, and wherein during the operation of the handheld radio transceiver the antenna element is at the same time sensor electrode of the capacitive sensor device and an antenna of the handheld radio transceiver, wherein the antenna element of the handheld radio transceiver is coupled with the capacitive sensor device and wherein during the operation of the handheld radio transceiver the antenna element is condifured at the same time as sensor electrode of the capacitive sensor device and as HF antenna of the handheld radio transceiver, wherein the sensor device further comprises a second electrode, which can be brought into a capacitive coupling with the antenna element, wherein one of the antenna element and the second electrode is operable as transmitting electrode and the respective other one as receiver electrode, and wherein the transmitting electrode can be fed with an electric alternating signal.

20. Handheld radio transceiver according to claim 19, wherein the lowpass filter comprises a microstrip line.

* * * * *

UNITED STATES PATENT AND TRADEMARK OFFICE
CERTIFICATE OF CORRECTION

| | | |
|---|---|---|
| PATENT NO. | : 9,247,504 B2 | Page 1 of 1 |
| APPLICATION NO. | : 14/001460 | |
| DATED | : January 26, 2016 | |
| INVENTOR(S) | : Holger Erkens | |

It is certified that error appears in the above-identified patent and that said Letters Patent is hereby corrected as shown below:

In the claims,

Column 14,
Claim 1, line 45, "…capacitive coupling with them antenna element, wherein one…"
---Change to--- "…capacitive coupling with the antenna element, wherein one…"

Column 16,
Claim 19, line 42, "…-ment is condifured at the same time as sensor electrode of the…"
---Change to--- "…-ment is configured at the same time as sensor electrode of the…"

Signed and Sealed this
Twelfth Day of April, 2016

Michelle K. Lee
*Director of the United States Patent and Trademark Office*